United States Patent
Ermey

(10) Patent No.: US 12,093,389 B2
(45) Date of Patent: Sep. 17, 2024

(54) DATA TRAFFIC CHARACTERIZATION PRIORITIZATION

(71) Applicant: Microsoft Technology Licensing, LLC, Redmond, WA (US)

(72) Inventor: Jonathan Ermey, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 17/694,420

(22) Filed: Mar. 14, 2022

(65) Prior Publication Data

US 2023/0289444 A1  Sep. 14, 2023

(51) Int. Cl.
    *G06F 21/56* (2013.01)
    *G06F 9/48* (2006.01)

(52) U.S. Cl.
    CPC .......... *G06F 21/566* (2013.01); *G06F 9/4881* (2013.01); *G06F 2221/034* (2013.01)

(58) Field of Classification Search
    CPC ................. G06F 21/566; G06F 9/4891; G06F 2221/034
    See application file for complete search history.

(56) References Cited

U.S. PATENT DOCUMENTS

| | | |
|---|---|---|
| 7,194,664 B1 | 3/2007 | Fung et al. |
| 8,245,212 B2 | 8/2012 | Steiner et al. |
| 9,135,145 B2 | 9/2015 | Voccio et al. |
| 9,176,842 B2 | 11/2015 | Chen et al. |
| 9,183,116 B1 | 11/2015 | Ajith Kumar et al. |
| 9,311,220 B1 | 4/2016 | Ha et al. |
| 9,727,635 B2 | 8/2017 | Shepherd et al. |
| 9,772,927 B2 | 9/2017 | Gounares et al. |
| 10,185,643 B2 | 1/2019 | Ajith Kumar et al. |
| 10,241,901 B2 | 3/2019 | Pho et al. |
| 10,484,506 B2 | 11/2019 | Faizanullah et al. |
| 10,877,873 B2 | 12/2020 | Richardson et al. |
| 10,915,425 B2 | 2/2021 | Wang |
| 2005/0125213 A1* | 6/2005 | Chen .................. G06F 11/3447 703/22 |

(Continued)

OTHER PUBLICATIONS

Dun, et al., "ParaTrac: A Fine-Grained Profiler for Data-Intensive Workflows", In Proceedings of the 19th ACM International Symposium on High Performance Distributed Computing, Jun. 21, 2010, pp. 37-48.

(Continued)

*Primary Examiner* — Hee K Song
(74) *Attorney, Agent, or Firm* — Ogilvie Law Firm

(57) ABSTRACT

Some embodiments process log data into traffic patterns, using call graph normalization and aggregation. Traffic patterns are characterized, by comparing traffic patterns, finding redundancies, locating coverage gaps, delimiting impact regions, spotting optimization candidates, performing timing analyses, predicting traffic flow, or other operations. Characterizations are prioritized, and priorities help guide operational changes in a computing system. Gaps between the traffic patterns of different environments or different scenarios may be located, leading to changes in signoff coverage or testing coverage or both. Deployment traffic anomalies may trigger rollback. Traffic patterns indicative of cyberattacks may trigger security countermeasures.

20 Claims, 10 Drawing Sheets

(56) References Cited

U.S. PATENT DOCUMENTS

| | | | |
|---|---|---|---|
| 2013/0326625 A1* | 12/2013 | Anderson | G06F 21/566 726/23 |
| 2019/0044959 A1* | 2/2019 | Chen | G06N 20/00 |
| 2019/0121979 A1* | 4/2019 | Chari | G06F 8/433 |
| 2019/0303297 A1* | 10/2019 | Fleming, Jr. | G06F 13/1668 |
| 2022/0012143 A1* | 1/2022 | Meeran | G06F 11/0751 |

OTHER PUBLICATIONS

Sambasivan, et al., "Principled Worklow-Centric Tracing of Distributed Systems", In Proceedings of the Seventh ACM Symposium on Cloud Computing, Oct. 5, 2016, pp. 401-414.

Zhao, et al., "Iprof: A Non-intrusive Request Flow Profiler for Distributed Systems", In Proceedings of USENIX Symposium on Operating Systems Design and Implementation, 2014, pp. 629-644.

Zhou, et al., "Distance Based Root Cause Analysis and Change Impact Analysis of Performance Regressions", In Journal of Mathematical Problems in Engineering, Jun. 21, 2015, 10 Pages.

Mazzoli, Robert, "Train for business continuity in your organization", Retrieved from: https://docs.microsoft.com/en-us/compliance/assurance/assurance-ebcm-plan-rehearsal-and-user-training, Nov. 18, 2021, 2 Pages.

"Query language", retrieved from <<https://en.wikipedia.org/wiki/Query_language>>, Sep. 28, 2021, 3 pages.

Koutra, et al., "Algorithms for Graph Similarity and Subgraph Matching", retrieved from <<https://www.cs.cmu.edu/~jingx/docs/DBreport.pdf>>, Dec. 4, 2011, 50 pages.

Brown, et al., "A Unique Graph Similarity Metric for Anomaly Detection", retrieved from <<https://www.osti.gov/servlets/purl/1639686>>, 2019, 12 pages.

"Application deployment and testing strategies", retrieved from <<https://cloud.google.com/architecture/application-deployment-and-testing-strategies>>, Feb. 5, 2020, 15 pages.

Molnar, "Live Visualization of GUI Application Code Coverage with GUITracer", retrieved from <<https://arxiv.org/pdf/1702.08013.pdf>>, Feb. 26, 2017, 5 pages.

"Reduce operator", retrieved from <<https://docs.microsoft.com/en-us/azure/data-explorer/kusto/query/reduceoperator>>, Jun. 1, 2021, 4 pages.

"Kusto Query Language (KQL) overview", retrieved from <<https://docs.microsoft.com/en-us/azure/data-explorer/kusto/query/>>, Jan. 5, 2022, 4 pages.

Vaarandi, "A Data Clustering Algorithm for Mining Patterns From Event Logs", retrieved from <<https://ristov.github.io/publications/slct-ipom03-web.pdf>>, 2003, 9 pages.

SergeyKanzhelev, "Support end-to-end cross-tier correlation #47", retrieved from <<https://github.com/microsoft/ApplicationInsights-dotnet/issues/47>>, Sep. 28, 2015, 20 pages.

"Microsoft/CorrelationVector", retrieved from <<https://github.com/Microsoft/CorrelationVector>>, Jun. 14, 2019, 3pages.

"Correlation_Vector structure (ntddk.h)", retrieved from <<https://docs.microsoft.com/en-us/windows-hardware/drivers/ddi/ntddk/ns-ntddk-correlation_vector>>, Apr. 1, 2021, 3 pages.

"Correlation Vector v3.0 [Draft]", retrieved from <<https://github.com/microsoft/CorrelationVector/blob/master/cV%20-%203.0.md>>, Jun. 11, 2019, 11 pages.

"International Search Report and Written Opinion Issued in PCT Application No. PCT/US2022/054041", Mailed Date: May 12, 2023, 09 Pages.

* cited by examiner

ASPECTS OF SOME TRAFFIC CHARACTERIZATIONS 206

| PATTERN COMPARISON 402 | REDUNDANCY 404 IN PATTERN |
| COVERAGE INSUFFICIENCY 406 | SPECIFIC 408 TO SCENARIO 410 |
| ANOMALY 412 IMPACT REGION 414 | PERFORMANCE 416 OPTIMIZATION 418 |
| CALL 420 TIMING 422 ANALYSIS 424 | FLOW 426 PER TIME INTERVAL 428 |

Fig. 4

ASPECTS OF SOME SERVICE ENTRY POINTS 312

APPLICATION PROGRAM INTERFACE 502 ROUTINE 504, 506

TRIGGERED 508 BACKGROUND TASK 510, 506

| USER INTERFACE ROUTINE 512, 506 | CHECK-IN 514 ROUTINE 516, 506 |

Fig. 5

ASPECTS OF SOME OPERATIONAL PRIORITY SCHEMAS 316

SIGNOFF 602 COVERAGE 604, 606 GAP 608, 634 PRIORITY 610, 216

TESTING 612 COVERAGE 614, 606 GAP 616, 634 PRIORITY 618, 216

UNEXPLAINED 620 REDUNDANCY 404 PRIORITY 622, 216

CYBERATTACK 624 PATTERN 626, 214 PRIORITY 628, 216

DEPLOYMENT 630 ANOMALY 412 PRIORITY 632, 216

Fig. 6

| ADDITIONAL ASPECTS OF SOME FUNCTIONALITIES 210 | | |
|---|---|---|
| (NON-)PRODUCTION (702) 704 ENVIRONMENT 100 | ENVIRONMENT 100 METADATA 706, 314 | SCENARIO 410 METADATA 708, 314 |

Fig. 7

| ASPECTS OF SOME TRAFFIC PATTERNS 214 |
|---|
| SIMILARITY 802 THRESHOLD / METRIC 804 / 806 |
| CURRENT / REQUISITE / EXAMPLE 808 / 810 / 812 — ENVIRONMENT 100 |
| CYBERATTACK 624 — DEPLOYMENT 630 — FLOW 426 — CONSTRICTION 814 |
| AGGREGATION 304: UNSUPERVISED LEARNING ALGORITHM 816 CLUSTER 818, QUERY LANGUAGE 820 GROUP 822, STRING COMPARISON 824 GROUP 822 |
| PERFORMANCE 416 TESTING 612, LOAD 826 TESTING 612, ANOMALY 412 CREATION 828, BURST 830 TESTING 612 |

Fig. 8

| ASPECTS OF SOME SCENARIOS 410 | |
|---|---|
| MOBILE APPLICATION 902 MANAGEMENT 904 | DEVICE GROUP 906 |
| DEVICE ENROLLMENT 908 | POLICY 910 DELIVERY 912 |
| DEVICE CHECK-IN 914 | DEVICE CONFIGURATION 916 COMPLIANCE 918 |

Fig. 9

| # | ParentId | Id | Caller |
|---|---|---|---|
| 1 | ROOT | CVBASE | _Unknow |
| 2 | CVBASE | CVBASE.001 | TrafficRou |
| 3 | CVBASE.001 | CVBASE.001.002 | Stateless/ Managen |
| 4 | CVBASE.001.002 | CVBASE.001.002.001 | StatelessI |
| 5 | CVBASE.001.002 | CVBASE.001.002.002 | StatelessI |
| 6 | CVBASE.001.002 | CVBASE.001.002.003 | StatelessI |

| Caller | Service | Http Verb |
|---|---|---|
| _Unknown | TrafficRoutingService | POST |
| TrafficRoutingService | StatelessApplicationManagementService | Action |
| StatelessApplicationManagementService | StatelessMAMService | Action |
| StatelessMAMService | StatefulMAMService | Get |
| StatelessMAMService | StatefulMAMService | SearchLinl |
| StatelessMAMService | StatefulMAMService | SearchLinl |

Fig. 13

| Url |
|---|
| https://##Endpoint##.microsoft.com/TrafficGateway/TrafficRoutingService/Wcs/Sta |
| https://##Endpoint##.microsoft.com/StatelessApplicationManagementService/Ap |
| https://##IPAddress##/StatelessMAMService/##Guid##//MAMApplicationInstances |
| https://##IPAddress##/StatefulMAMService/##Guid##//MAMDefaultPolicyAssignm |
| https://##IPAddress##/StatefulMAMService/##Guid##//MAMAccounts(##Value(s)# |
| https://##IPAddress##/StatefulMAMService/##Guid##//MAMAccounts(##Value(s)# |

Fig. 14

.com/TrafficGateway/TrafficRoutingService/Wcs/StatelessApplicationManagementS
.com/StatelessApplicationManagementService//ApplicationInstances(##Value(s)##)

MAMService/##Guid##//MAMApplicationInstances(##Value(s)##)

MAMService/##Guid##//MAMDefaultPolicyAssignments(##Value(s)##)
MAMService/##Guid##//MAMAccounts(##Value(s)##)
MAMService/##Guid##//MAMAccounts(##Value(s)##)

Fig. 15

| ParentId | | Id | | Caller | | Service | | Ve |
|---|---|---|---|---|---|---|---|---|
| | | z5Sd4/FQgkSu3zOeBxWEcQ | | StartingService | | ExampleService1 | | Ge |
| z5Sd4/FQgkSu3zOeBxWEcQ | | z5Sd4/FQgkSu3zOeBxWEcQ.001 | | ExampleService1 | | ExampleService2 | | Ge |

| | Verb | | url |
|---|---|---|---|
| | Get | | https://1.2.3.123/ExampleService1/df22d4c9-fff-8905-0447-042209323804/Values(GuidKey=guid'd9444e2 |
| | Get | | https://3.2.1.3.1/ExampleService2/df22d4c9-0002-7241-0447-042209323023/Values(GuidKey=guid'd9444e |

...alues(GuidKey=guid'd9444e24-78c3-4969-9d0a-4b3f09c2d0f4' StringKey='956d5e20-e16d-bbf5-0457-e2d959a76688')
...ues(GuidKey=guid'd9444e24-78c3-4969-9d0a-4b3f09c2d0f4' StringKey='956d5e20-e16d-bbf5-0457-e2d959a76688')

| | Verb | | url |
|---|---|---|---|
| | Get | | https://##IPAddress##/ExampleService1/##Guid##/Values(##Guid##,##Value(s)##) |
| | Get | | https://##IPAddress##/ExampleService2/##Guid##/Values(##Guid##,##Value(s)##) |

Fig. 17

DATA TRAFFIC CHARACTERIZATION PRIORITIZATION

BACKGROUND

Noon In a very general sense, a computing system may be described as containing individual units which communicate with each other. In some situations, a record may be created of at least some of these communications, and may then be analyzed. However, in practice there are often different ways to define individual units of a computing system, different ways to define what constitutes a communication between units, different ways to record at least some portion of at least some of the communications, a variety of different communication analyses which may have different respective purposes, and different ways to perform a given kind of analysis. Some instances in this very large space of different possibilities have received substantial attention, e.g., scanning emails for malware, or calculating a cyclic redundancy check on a network frame. But many other possibilities have received little or no prior attention.

Accordingly, many advances are still possible in the technology for analyzing communications within a computing system.

SUMMARY

Some embodiments described herein help developers or other people gain insights into the behavior of a computing system, by processing traffic of the system to reveal patterns which are then characterized in various ways. Based on the characterizations, operational priorities may be assigned to promote goals such as improved reliability through better signoff coverage or better testing coverage or both, better understanding of the computing system's behavior in particular scenarios or particular environments or both, improved system performance after removal of a redundancy or from a timing analysis, enhanced security through anomaly detection, increased solution reliability and availability through deployment problem spotting, identification of impact regions for better incident handling or defect handling, and so on.

In some embodiments, traffic characterization prioritization includes computing or otherwise obtaining at least one traffic pattern representing data traffic of a monitored computing system, formulating a traffic characterization based on the traffic pattern, and then assigning an operational priority to the formulated characterization based on an operational priority schema. In some, the traffic pattern includes an aggregation of a plurality of normalized call graphs which share an entry node, with the entry node representing a service entry point to the monitored computing system.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating aspects of some traffic characterizations;

FIG. 5 is a block diagram illustrating aspects of some service entry points;

FIG. 6 is a block diagram illustrating aspects of some operational priority schemas;

FIG. 7 is a block diagram illustrating some additional aspects of some traffic characterization prioritization functionalities;

FIG. 8 is a block diagram illustrating aspects of some traffic patterns;

FIG. 9 is a block diagram illustrating aspects of some system behavior scenarios;

FIGS. 13-15 show example traffic data in a table;

FIG. 17 shows call tree data before and after a normalization.

DETAILED DESCRIPTION

Overview

Figure 1:
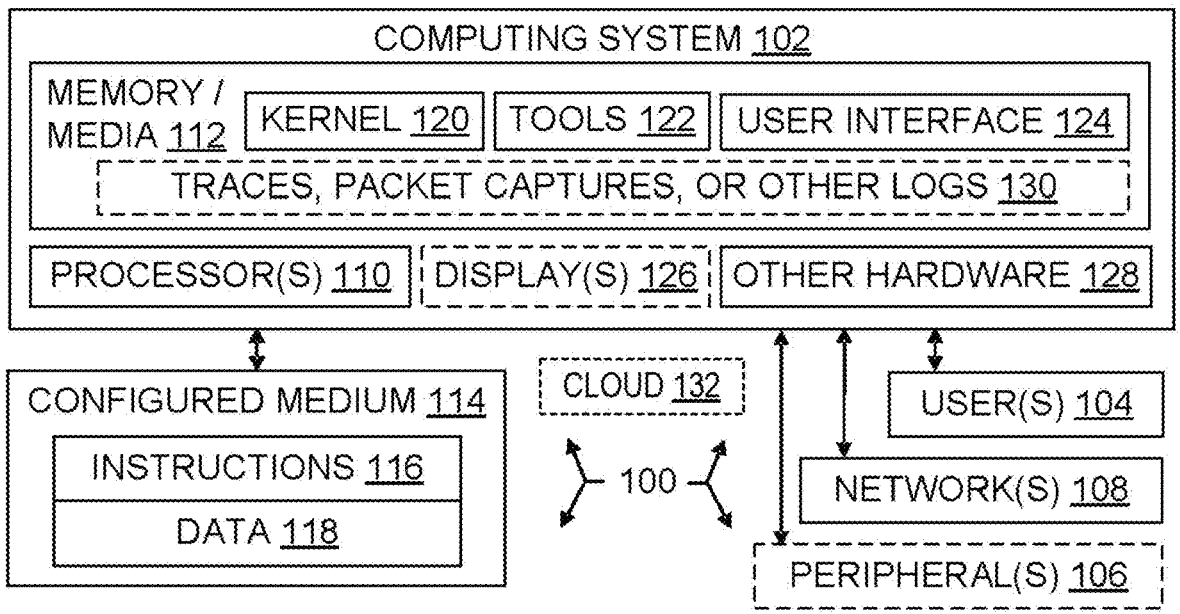
FIG. 1 is a block diagram illustrating computer systems and also illustrating configured storage media.

Innovations may expand beyond their origins, but understanding an innovation's origins can help one more fully appreciate the innovation. In the present case, some teachings described herein were motivated by technical challenges arising from efforts to identify system issues by analyzing log files.

For instance, a Microsoft innovator observed that software developers and other engineers may confront many challenges when deciding what to test, and how to model tests. One approach organizes system testing based at least in part on developer-defined usage scenarios. For example, onboarding a new user, changing an existing user's role or permissions, and offboarding a user are three scenarios for testing a system whose behavior is meant to vary according to which users are recognized and according to what role or permissions are authorized for a given user. Normal operation, and operation under a denial of service attack, are two scenarios for testing a system whose behavior is meant to include surviving a denial of service attack, or for testing a system whose behavior is meant to include gracefully degrading under a denial of service attack. These are merely examples. One of skill will recognize that many other scenarios may be defined for testing the resilience, efficiency, accuracy, security, availability, integrity, usability, or other behavioral aspect of a computing system.

Accordingly, a developer may face technical questions such as what scenarios to utilize, how to vary the scenarios, what parts or behaviors of a system to test, how to model the tests, and how to determine if a scenario is adequately tested. A better understanding of a system's traffic may help a developer answer these kinds of questions. The developer may try to determine what traffic patterns the system might follow, and what traffic patterns the system actually does follow. Comparing those two may yield helpful insights into system behavior. But an effort to understand system traffic raises challenges in turn, such as how to efficiently and effectively identify and analyze system traffic.

Traffic in a computing system may be captured in various ways, including in particular by logging tools that store aspects of the traffic in logs. The Microsoft innovator investigated ways to use logs to identify issues in a system. The innovator observed that calls between APIs or other routines within a computing system may be tracked using correlation vectors.

Microsoft has internally used a correlation vector format and protocol specification to trace and correlate events through a distributed computing system. At least one version of a correlation vector specification has also been made available external to Microsoft. Some published examples of correlation vectors include:

A. PmvzQKgYek6Sdk/T5sWaqw.B
A.e8iECJiOvUGPvOVtchxG9g.F.A.23

The Microsoft innovator explored ways to normalize logs, and ways to use normalized logs to identify issues in a system. The innovator's investigation led to particular approaches to normalization of traffic when the traffic includes correlation vectors. In some embodiments described herein, normalized correlation vectors are gathered into normalized call trees, which are used as a basis of traffic patterns. The traffic patterns can be associated with particular scenarios. Traffic patterns may also or instead be associated with particular development environments, e.g., a production environment or a non-production environment. The traffic patterns can be characterized, e.g., according to how they compare to one another or how they compare to a requisite traffic pattern, or according to the presence of redundancies, or the extent of an impact region, for example. Operational priorities can be assigned to these characterized traffic patterns, thereby prioritizing the attention of developers and other persons to respective system behaviors.

Embodiments taught herein may lead developers to productive activity that would not have otherwise occurred, or that would have been less thorough or less prompt if it did occur. One productive activity example is reviewing a signoff test plan to make sure it provides adequate coverage. A gap in signoff coverage may be discovered through an embodiment, e.g., when the embodiment performs a traffic pattern characterization and prioritization that reveals a traffic pattern in a production system that was never tested in the pre-production environment. Another productive activity example is monitoring a small test deployment for the absence of a desired traffic pattern, or for the presence of an undesirable traffic pattern. If the small test deployment does not behave as the developers intended, then a full deployment can be postponed until the problem is fixed, thus limiting the impact of the problem to a small region in or around the test deployment.

These are merely examples. One of skill will recognize that traffic pattern characterization and prioritization teachings provided herein may also be beneficially applied in many other situations.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 132. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated. The user interface 124 may be part of a business intelligence, graphing, or other tool 122.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 132 and/or other network 108 via network interface equipment, for example.

Each computer system 102 includes at least one processor 110. The computer system 102, like other suitable systems, also includes one or more computer-readable storage media 112, also referred to as computer-readable storage devices 112. Traces, packet captures, and other logs 130 may be stored in storage 112; "log" is used broadly herein to include execution traces, packet captures, and other digital records of communication 204 from or between one or more items in a computing system 102. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, traffic characterization functionality 210 or traffic prioritization functionality 210 or traffic characterization prioritization functionality 210 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
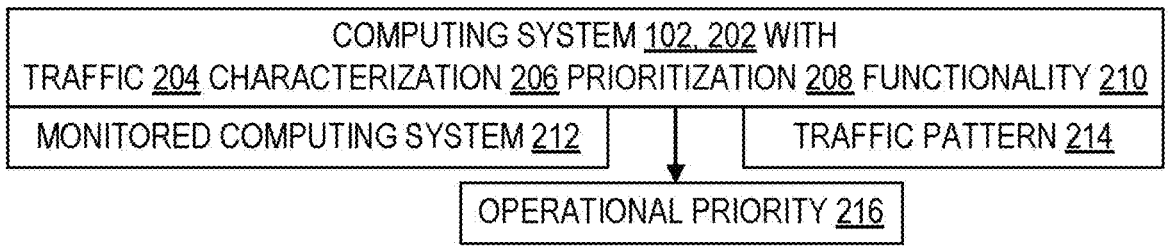
FIG. 2 is a block diagram illustrating aspects of a computing system which has one or more of the traffic characterization prioritization enhancements taught herein.

FIG. 2 illustrates a computing system 102 configured by one or more of the traffic characterization prioritization enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
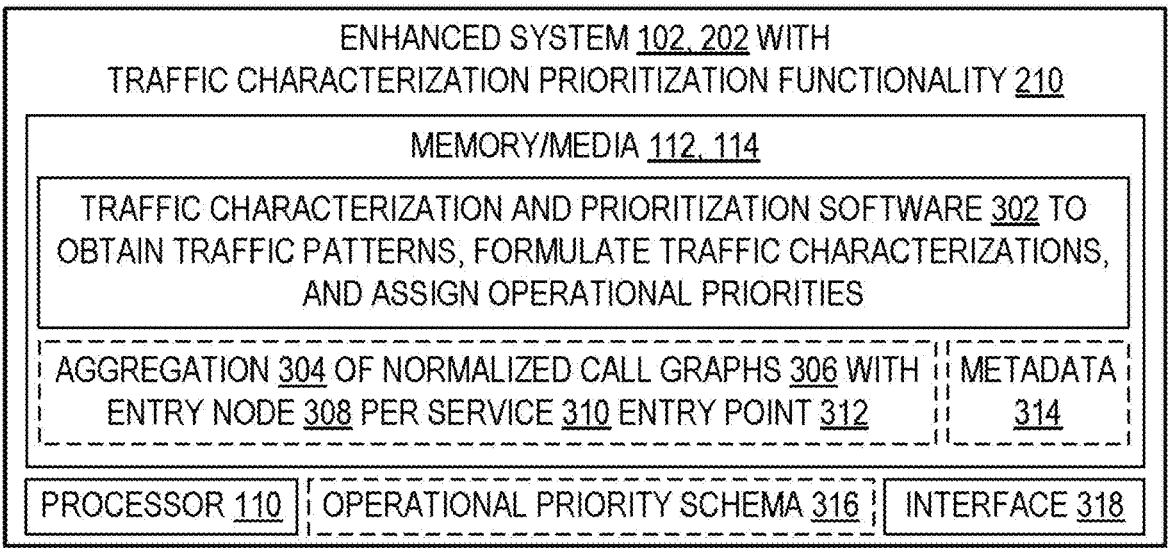
FIG. 3 is a block diagram illustrating an enhanced system configured with traffic characterization prioritization functionality.

FIG. 3 illustrates an enhanced system 202 which is configured with traffic characterization prioritization software 302 in order to provide traffic characterization prioritization functionality 210. Software 302 and other FIG. 3 items are discussed at various points herein, and additional details regarding them are provided in the discussion of a List of Reference Numerals later in this disclosure document.

FIG. 4 shows some aspects of traffic characterization 206. This is not a comprehensive summary of all traffic characterizations 206, or of all aspects of traffic 204, or of all aspects of traffic patterns 214 for potential use in or by traffic characterization prioritization functionality 210. FIG. 4 items are discussed at various points herein, and additional details regarding them are provided in the discussion of a List of Reference Numerals later in this disclosure document.

FIG. 5 shows some aspects of service entry points 312. This is not a comprehensive summary of all service entry points 312, or of all aspects of services 310, or of all aspects of call graphs 306 for potential use in or by traffic characterization prioritization functionality 210. FIG. 5 items are discussed at various points herein, and additional details regarding them are provided in the discussion of a List of Reference Numerals later in this disclosure document.

FIG. 6 shows some aspects of some operational priority schemas 316. This is not a comprehensive summary of all schemas 316, or of all aspects of operational priority 216 for potential use in or by traffic characterization prioritization functionality 210. FIG. 6 items are discussed at various points herein, and additional details regarding them are provided in the discussion of a List of Reference Numerals later in this disclosure document.

FIG. 7 shows some aspects of some traffic characterization prioritization functionality 210. This is not a comprehensive summary of all aspects of items for potential use in or by traffic characterization prioritization functionality 210. FIG. 7 items are discussed at various points herein, and additional details regarding them are provided in the discussion of a List of Reference Numerals later in this disclosure document.

FIG. 8 shows some aspects of some traffic patterns 214. This is not a comprehensive summary of all traffic patterns 214, or of all aspects of traffic 204 for potential use in or by traffic characterization prioritization functionality 210. FIG. 8 items are discussed at various points herein, and additional details regarding them are provided in the discussion of a List of Reference Numerals later in this disclosure document.

FIG. 9 shows some aspects of some scenarios 410. This is not a comprehensive summary of all scenarios 410, or of all aspects of categorizing traffic 204 or traffic patterns 214 for potential use in or by traffic characterization prioritization functionality 210. FIG. 9 items are discussed at various points herein, and additional details regarding them are provided in the discussion of a List of Reference Numerals later in this disclosure document.

In some embodiments, the enhanced system 202 may be networked through an interface 318. An interface 318 may include hardware such as network interface cards, software such as network stacks, APIs, or sockets, combination items such as network connections, or a combination thereof.

In some embodiments, an enhanced system 202 includes a computing system 202 which is configured to assign operational priorities 216 to traffic characterizations 206 of a monitored computing system 212, 102. The enhanced system 202 includes a digital memory 112 and a processor 110 in operable communication with the memory. The digital memory 112 may be volatile or nonvolatile or a mix. The processor 110 is configured to execute traffic characterizations prioritization 208 including: (a) computing or otherwise obtaining 1102 at least one traffic pattern 214 representing data traffic 204 of the monitored computing system 212, the traffic pattern including an aggregation 304 of a plurality of normalized call graphs 306 which share an entry node 308, the entry node representing a service entry point 312 to the monitored computing system, (b) formulating 1104 a traffic characterization 206 by at least one of: comparing 1106 two obtained traffic patterns to each other, finding 1108 a redundancy 404 in an obtained traffic pattern, or locating 1110 a coverage insufficiency 406 in an obtained traffic pattern, and (c) assigning 1122 an operational priority 216 to the formulated characterization based on an operational priority schema 316.

In some embodiments, the enhanced computing system 202 includes at least one obtained traffic pattern 214 which includes the entry node 308 representing the service entry point 312, and the service entry point includes at least one of the following: a user interface routine 512, 506, a device check-in routine 516, 506, a triggered background task 510, 506, or an application program interface 502 routine 504, 506. These are examples; other routines 506 may also or instead serve as entry node 308 routines.

In some embodiments, the enhanced computing system 202 includes the operational priority schema 316, and the operational priority schema includes at least one of the following: a signoff coverage gap operational priority 610 designated 1204 for prioritizing a signoff coverage gap 608; a testing gap operational priority 618 designated for prioritizing a testing gap 616; an unexplained redundancy operational priority 622 designated for prioritizing an unexplained redundancy 404; a cyberattack pattern operational priority 628 designated for prioritizing a cyberattack pattern 626; or a deployment anomaly operational priority 632 designated 1204 for prioritizing a deployment anomaly 412.

In some embodiments, the enhanced computing system 202 includes at least one obtained traffic pattern 214 which includes environment metadata 706 distinguishing 1208 between a production environment 704 and a non-production environment 702. In some, different non-production environments 702 are distinguished 1208 in the metadata 706, e.g., an alpha test environment and a closed beta test environment.

In some embodiments, the enhanced computing system 202 includes at least one obtained traffic pattern 214 which is associated 1212 with scenario metadata 708, the scenario metadata being at least partially in a natural language, e.g., English, Chinese, French, German, Japanese, Korean, Spanish, or another natural language. The metadata may be entered by a developer for use in reminding the developer of the constraints or goals of the scenario, or informing others about the scenario. For instance, scenario metadata 708 might include text stating something like "New device enrollment for an employee who already has a company email."

As for technical benefits, formulating 1104 a traffic characterization 206 by comparing 1106 two obtained traffic patterns to each other helps improve system quality by identifying traffic pattern differences that indicate differences in system behavior, or by confirming a lack of difference. For instance, suppose a production traffic pattern calls routines Rn that were not called in a pre-production traffic pattern. This difference indicates the routines Rn were not exercised pre-production, so they may have been added without adequate testing first. Their addition could be an unwitting violation of development protocols, or the new routines may have been injected maliciously by a threat actor. Conversely, suppose comparison 1106 reveals that a production traffic pattern fails to call routines Rn that were called in the pre-production traffic pattern. Those routines Rn would not be needed if they only support a deprecated user experience. Alternately, it may be that the routines Rn are designed to support the current set of user experiences, but they were made unreachable by an error introduced into the production release after the re-production traffic pattern was generated.

Additional benefits will also be recognized. For example, assigning 1122 an operational priority 216 to the formulated characterization based on an operational priority schema 316 has the benefit of avoiding or reducing damage and cost that would otherwise arise from delayed attention to a characterization. Suppose an operational priority schema 316 places a higher (more important, more urgent) priority 216 on a cyberattack pattern priority 628 than on a deployment anomaly priority 632, which in turn has a higher priority than an unexplained redundancy priority 622. Suppose also that all three priorities 628, 632, and 622 are presented simultaneously to a group of admins or other personnel which is too small, or stretched too thin, to address all the underlying problems simultaneously. Then as a result of the prioritization schema 316, the apparent cyberattack would be addressed first, then the anomalous deployment would be rolled back, and finally the unexplained redundancy would be explored to see if a performance improvement is possible.

These examples and scenarios are illustrative, not comprehensive. One of skill informed by the teachings herein will recognize that many other situations and many other variations are also taught. In particular, different embodiments or configurations may vary as to the particular characterizations 206, particular priorities 216, particular scenarios 410, particular environments 100, and particular kinds of traffic 204 involved, for example, yet still be within the scope of the teachings presented in this disclosure.

Other system embodiments are also described herein, either directly or derivable as system versions of described processes or configured media, duly informed by the extensive discussion herein of computing hardware.

Although specific traffic characterization prioritization architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different machines, for example, as well as other technical features, aspects, mechanisms, rules, criteria, expressions, hierarchies, operational sequences, data structures, environment or system characteristics, or other traffic characterization prioritization functionality 210 teachings noted herein, and may otherwise depart from the particular illustrative examples provided.

Processes (a.k.a. Methods)

Figure 11:
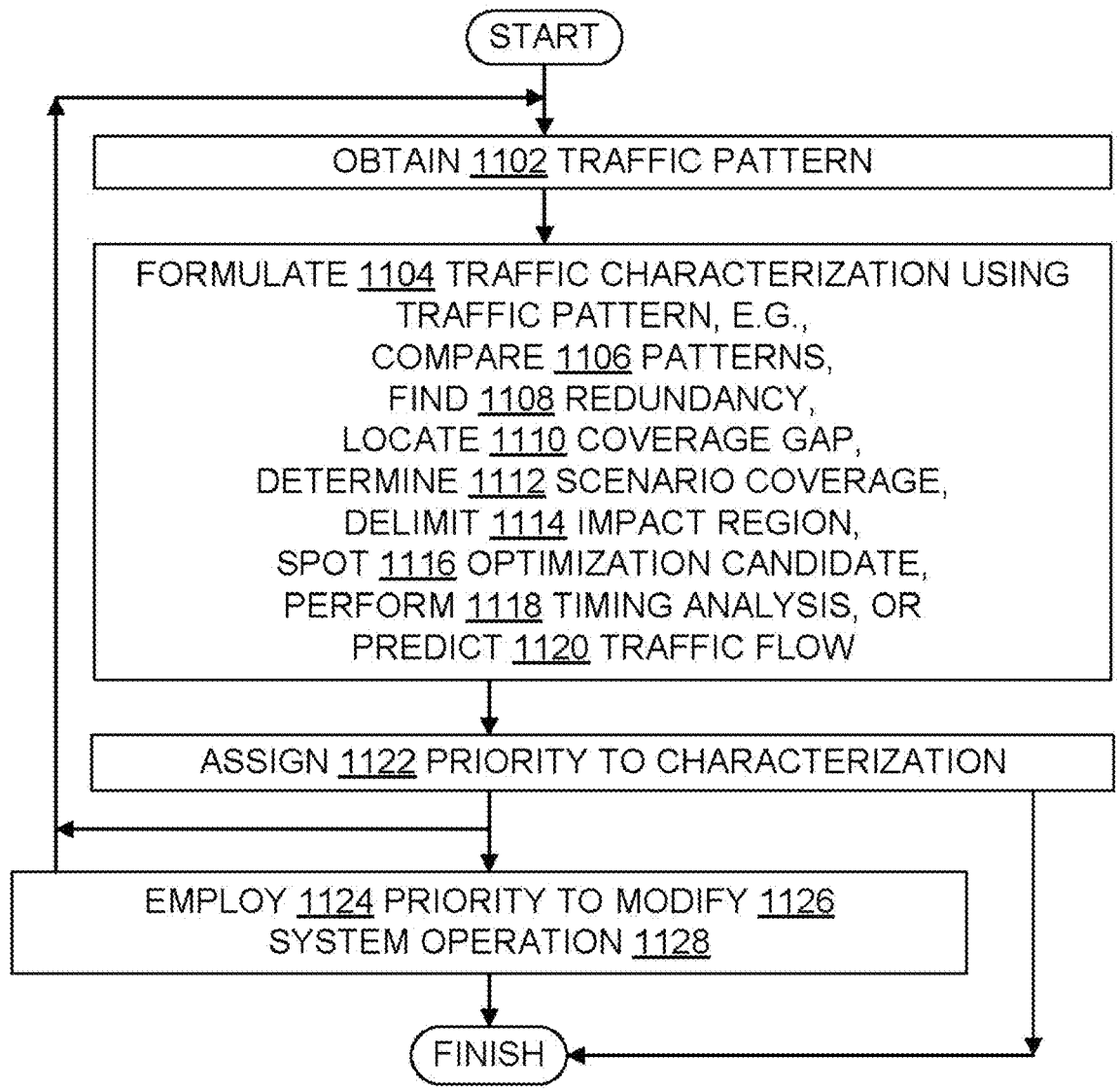
FIG. 11 is a flowchart illustrating steps in some traffic characterization prioritization methods.
Figure 12:
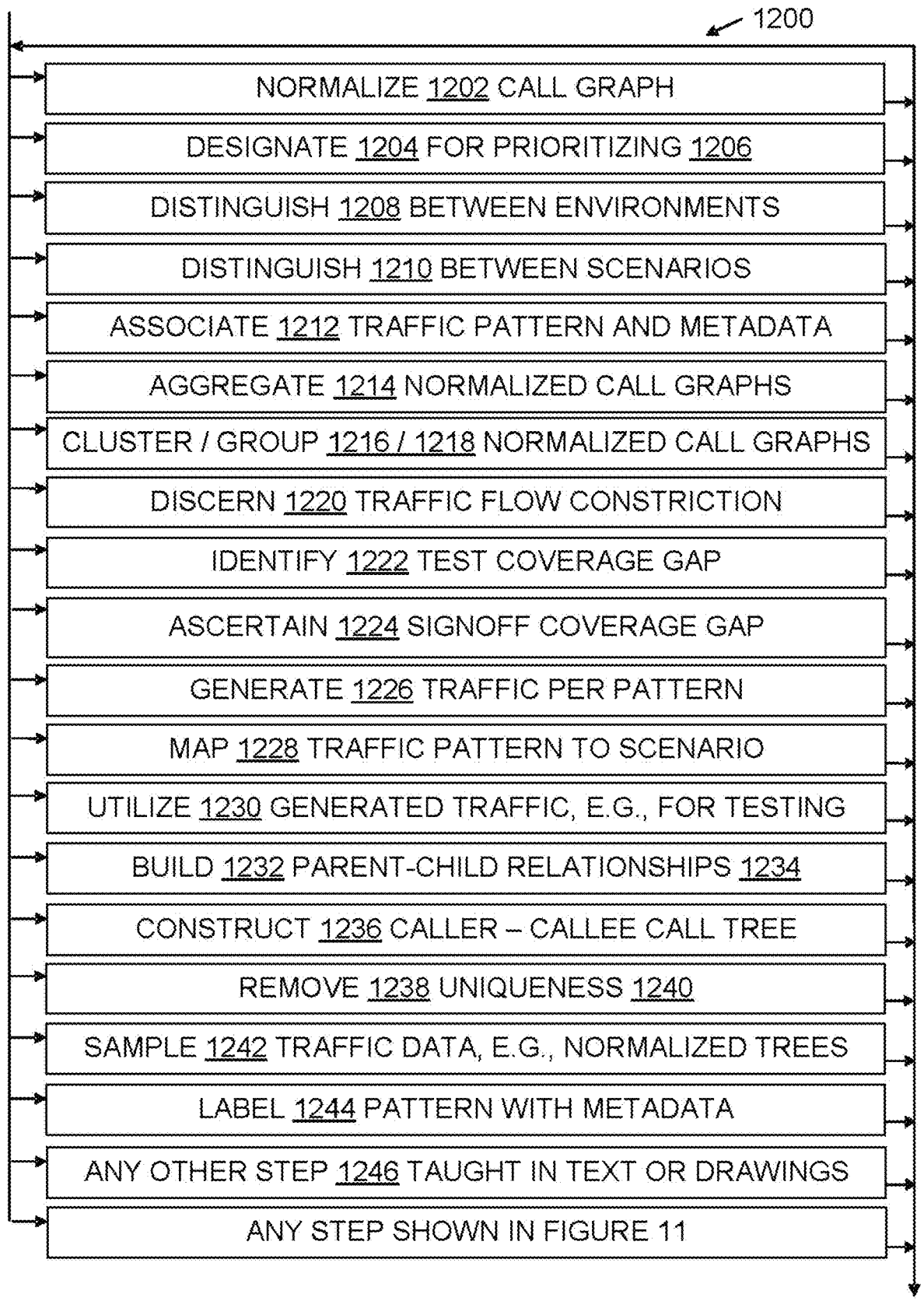
FIG. 12 is a flowchart further illustrating steps in some traffic characterization prioritization methods, incorporating FIG. 11.

Methods (which may also be referred to as "processes" in the legal sense of that word) are illustrated in various ways herein, both in text and in drawing figures. FIGS. 11 and 12 illustrate families of methods 1100, 1200 that may be performed or assisted by an enhanced system, such as system 202 or another functionality 210 enhanced system as taught herein. FIG. 12 includes some refinements, supplements, or contextual actions for steps shown in FIG. 11, and incorporates the steps of FIG. 11 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may enter text for subsequent use as scenario metadata 708. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 11 and 12. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1100 or 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method for traffic characterization prioritization, the method executed by a computing system, the method including: obtaining 1102 at least one traffic pattern representing data traffic, the traffic pattern including an aggregation 304 of a plurality of normalized call graphs 306 which share an entry node 308, the entry node representing a service entry point 312; formulating 1104 a traffic characterization 206 by at least one of: comparing 1106 two obtained traffic patterns 214 to each other, finding 1108 a redundancy 404 in an obtained traffic pattern, locating 1110 a coverage insufficiency 406 in an obtained traffic pattern, determining 1112 a scenario-specific coverage 606 of an obtained traffic pattern, delimiting 1114 an impact region 414 of an anomaly 412 based on an obtained traffic pattern, spotting 1116 a performance optimization 418 candidate, performing 1118 a call timing analysis 424, or predicting 1120 a traffic flow 426 based on time interval 428 portions of at least one obtained traffic pattern; and assigning 1122 an operational priority 216 to the formulated traffic characterization based on an operational priority schema 316.

In some embodiments, formulating 1104 the traffic characterization includes comparing 1106 two obtained traffic patterns to each other, and the comparing includes at least one of: comparing a production environment 704 traffic pattern to a non-production environment 702 traffic pattern; comparing a current 808 deployment 630 traffic pattern to a requisite 810 deployment 630 traffic pattern; comparing a current 808 flow 426 traffic pattern to a typical 812 flow traffic pattern; comparing a monitored 212 traffic pattern to a cyberattack traffic pattern 626; or comparing traffic patterns 214 for similarity 802 using a similarity threshold 804.

In some embodiments, formulating 1104 the traffic characterization includes finding 1108 a redundancy 404 in an obtained traffic pattern.

In some embodiments, obtaining 1102 at least one traffic pattern includes normalizing 1202 each of at least two call graphs 1000.

In some embodiments, obtaining 1102 at least one traffic pattern includes aggregating 1214 the plurality of normalized call graphs 306, and the aggregating includes at least one of: clustering 1216 normalized call graphs using an unsupervised learning algorithm 816; grouping 1218 normalized call graphs using a query language 820 operation; or grouping 1218 normalized call graphs using a string comparison 824 algorithm.

In some embodiments, formulating 1104 the traffic characterization includes discerning 1220 a traffic flow constriction 814.

In some embodiments, formulating 1104 the traffic characterization includes determining 1112 the scenario-specific coverage 606 of the obtained traffic pattern. In some variations, an embodiment checks code coverage, namely, whether a given scenario or pattern has been executed. In some, an embodiment aggregates the code coverage from all of the calls associated in a service, producing a scenario code coverage. Some systems 102 provide embedded symbols in binaries which can be used to show the line of code and file location of each call, and that information can be joined with code coverage. Some embodiments compare what code was executed in a non-testing scenario with what code was tested.

In some embodiments, formulating 1104 formulating the traffic characterization includes at least one of: identifying 1222 a test coverage gap 616 at least in part by comparing 1106 a first environment's traffic pattern to a second environment's traffic pattern; or ascertaining 1224 a signoff coverage gap 608.

In some embodiments, formulating 1104 the traffic characterization includes delimiting 1114 an impact region 414 of an anomaly 412 in the obtained traffic pattern.

In some embodiments, the method 1200 includes generating 1226 traffic 204 based on a traffic pattern 214, and utilizing 1230 the generated traffic for at least one of: performance 416 testing 612, load 826 testing 612, anomaly 412 creation 828, or burst 830 testing 612.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as traffic characterization prioritization software 302, normalized call graphs 306, metadata 314, operational priorities 216, traffic patterns 214, and traffic characterizations 206, in the form of data 118 and instructions 116, read from a removable storage medium 114 and/or another source such as a network connection, to form a configured storage medium. The configured storage medium 112 is capable of causing a computer system 102 to perform technical process steps for traffic characterization prioritization, as disclosed herein. The Figures thus help illustrate configured storage media embodiments and process (a.k.a. method) embodiments, as well as system and process embodiments. In particular, any of the process steps illustrated in FIG. 11 or 12, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a traffic characterization prioritization method. This method includes: obtaining 1102 at least one traffic pattern representing data traffic, the traffic pattern including an aggregation of a plurality of normalized call graphs which share an entry node, the entry node representing a service entry point; mapping 1228 the traffic pattern to a scenario 410; formulating 1104 a traffic characterization based on at least the obtained traffic pattern; and assigning 1122 an operational priority to the formulated traffic characterization in the scenario based on an operational priority schema.

In some embodiments, the scenario 410 includes at least one of: a mobile application management scenario 904; a device enrollment scenario 908; a device check-in scenario 914; a policy delivery scenario 912; a device configuration compliance scenario 918; or a targeted device group scenario 906.

In some embodiments, formulating 1104 the traffic characterization includes performing 1118 a call timing analysis.

In some embodiments, formulating 1104 the traffic characterization includes at least one of: comparing 1106 a production environment traffic pattern 704, 214 to a non-production environment traffic pattern 702, 214; or comparing 1106 a current flow traffic pattern 808, 426, 214 to a typical flow traffic pattern 812, 426, 214.

In some embodiments, formulating 1104 the traffic characterization includes comparing 1106 a current deployment traffic pattern 808, 630, 214 to a requisite deployment traffic pattern 810, 630, 214.

Additional Observations

Additional support for the discussion of traffic characterization prioritization functionality 210 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments use or provide service insights from modeled traffic patterns using normalized call tree compositions. Some model traffic patterns by using event processing and data analysis techniques. Using these models, a developer is better able to understand what a system is doing, and what it is not doing.

Some embodiments use unique identifiers that are bookkept (e.g., correlation vectors) to build 1232 parent-child relationships 1234 between service callers and service callees. From the parent-child relationships, an embodiment constructs 1236 a call tree 1000 as an intermediate traffic model. By processing the constructed call tree, the embodiment removes 1238 uniqueness 1240 in the data through a process of normalization 1202. This set of operations may be repeated over a large sample 1242 set of call trees, allowing the embodiment to aggregate 1214 data to create usage patterns 214. After traffic 204 is modeled in this way, the embodiment has a data set it can process further in various ways.

For example, some embodiments can compare 1106 production usage patterns against pre-production environments' test usage patterns to discover signoff coverage gaps.

Some embodiments can compare 1106 production usage patterns against pre-production environments to auto-generate tests 612 that match. This may be done, e.g., to help test performance, heavy loads or particular loads, or particular 1210 scenarios 410, or for a mixture thereof such as testing cache performance with a heavy transaction load during a rolling server security update scenario.

Some embodiments can label 1244 traffic models 214 with scenario metadata, thus facilitating measurements of scenario coverage.

Some embodiments can analyze the data to detect 1108 redundant patterns within models 214 and suggest logical optimizations based on automated traffic model analysis.

Some embodiments can supply visualized traffic models as part of a threat model ideation framework for security reviews.

Some embodiments can delimit a blast radius 414 based on which call trees involve one or more failed tree nodes 1102.

Some embodiments can measure performance and timing data of these usage patterns 214 to detect bottlenecks 814 in the system.

Some embodiments can use machine learning to show usage trends and projections on time-bucketed aggregations, to display a view of current and future projected usage.

Some embodiments can use machine learning for anomaly detection, e.g., to help protect a system against spikes and dips.

Some embodiments can prioritize code coverage efforts by joining code coverage with usage data through introducing code location info into tree data.

Some embodiments can recommend a deployment roll back, or automatically implement a roll back, based on an anomalous traffic model detected during rollout.

Figure 10:
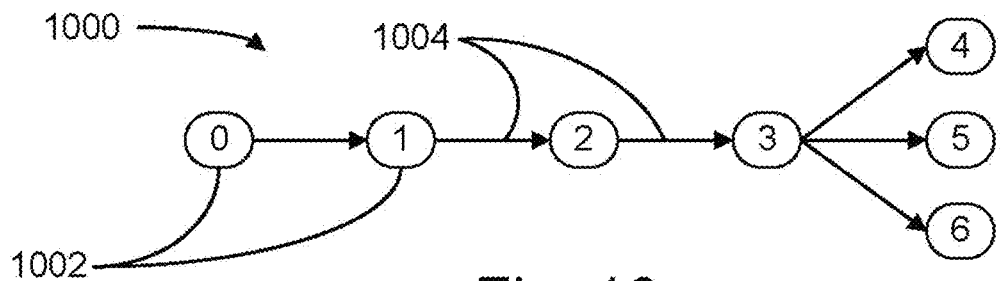
FIG. 10 is a diagram illustrating aspects of a call tree.

As another example, in some embodiments a call into a front-end service generates a unique identifier such as a correlation vector. The correlation vector is then bookkept as the call propagates in the system. FIGS. 13-15 show some example data in a table which has the following columns: #. ParentId, Id, Caller, Service, Http Verb, Url. Correlation vector bookkeeping is illustrated, e.g., in the Id column. The table is spread over FIGS. 13-15 in order to satisfy patent drawing format requirements; in the absence of those format requirements, the table could be shown in a single unitary form in a single drawing. Regardless, by utilizing the bookkept correlation vector or a similar ID, an embodiment can create 1236 a call tree, e.g., along the lines of the call tree 1000 shown in FIG. 10.

Figure 16:
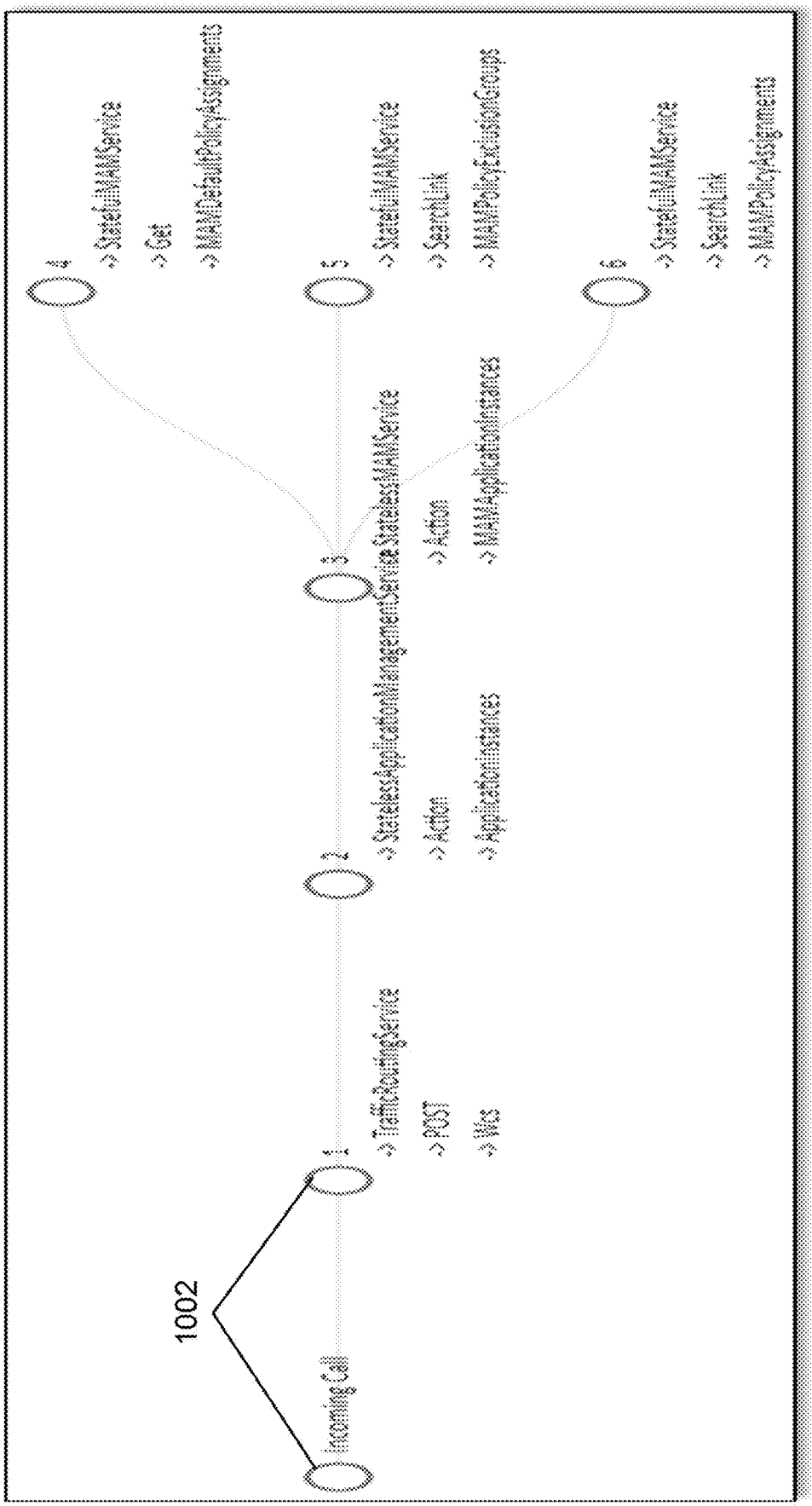
FIG. 16 shows an annotated call tree.

FIG. 16 shows an annotated call tree corresponding to the table shown in FIGS. 13-15. In FIG. 16, a text associated with the leftmost node 1002 is "Incoming Call". Node 1 has associated texts "→ExampleService1", "→POST", and "→EndpointURL". Node 2 has associated texts "→ExampleService2", "→Action", and "→EndpointURL". Node 3 has associated texts "→ExampleService3", "→Action", and "→EndpointURL". Node 4 has associated texts "→ExampleService4", "→Get", and "→EndpointURL". Node 5 has associated texts "→ExampleService5", "→SearchLink", and "→EndpointURL". Node 6 has associated texts "→ExampleService4", "→SearchLink", and "→EndpointURL".

Using text analytics, an embodiment can normalize 1202 calls such as those indicated in FIGS. 10, 13-16, to make 1238 them non-unique. After such normalization, the embodiment can find matches of a pattern embodied in the normalized call tree, and then aggregate 1214 the matches in order to form 1102 a traffic pattern 214.

FIG. 17 further illustrates call tree normalization 1202. FIG. 17 includes four rows, in order to satisfy patent drawing format requirements. In the absence of those requirements two rows could be depicted: one showing the data prior to normalization, and one showing the data after normalization, The top three rows in in FIG. 17 show the data prior to normalization, and the bottom row shows the data after normalization.

Some embodiments perform a batch creation pre-processing phase. This phase may include sampling 1242 correlation vectors from a computing system 212, e.g., from each service 310 in a production system 212, or in a selfhost system 212. Sampling may include periodically detecting each distinct service in the system within a given time range and environment. Then for each service, the embodiment may sample N distinct correlation vectors (e.g., with N=1000), perform initial data filtering and cleanup, perform an anti-join with an already-computed tree table to help avoid duplicate correlation vectors, and then gather the resulting correlation vectors into batches for call tree processing.

Some embodiments perform a call tree construction phase. This phase may include the following. For each correlation vector base in a batch, get all the rows (tree nodes) for this correlation vector base, normalize the URLs, build the call tree, create normalized and static call tree data sets, serialize the call tree data sets, encode the serialized data sets, take a hash of the encoded serialized normalized data set, and for each correlation vector base save this data with a timestamp to pre-aggregate tables.

Normalizing URLs may be done, e.g., using string replacements. Some example string replacements are:
replace("(A|a)(P|p)(I|i)(-|)(V|v)ersion=[^&]*", "api-version=##ApiVersion ##")
replace("(C|c)lient=[^&]*", "client=##Client ##")
replace("(D|d)evice(H|h)ealth=[^&]*", "DeviceHealth=##DeviceHealth ##")

One of skill in the art will acknowledge that other string replacement operators may be used, and other characters or character sequences than "##" may be used to indicate normalized portions of an URL.

In some embodiments, building a call tree may be performed using code such as the following:
extend cVTrim=replace(@"\.000", " ", cV)
extend cVN=replace(@"^(([[:alnum:]|/|\+){1,})\.", "CVBASE.", cVTrim)
extend ParentId=replace(@"\.[[:digit:]]{3}$", " ", cVN)
extend ParentId=iff(ParentId !contains @".", "CVBASE", ParentId)
extend Id=iff(cVN !contains @".", "CVBASE", cVN)
extend ParentId=iff(Id==ParentId, "ROOT", ParentId)

In this example code, "cV" indicates a correlation vector, and the first two lines normalize a correlation vector base. The third line of this example code performs parent/child detection by removing trailing digits. The last three lines of this example code perform base and root node detection (no dots). One of skill in the art will acknowledge that other operators may be used, and that other character sequences than "CVBASE" and "ROOT" may be used in a normalized URL to indicate a correlation vector base or similar structure, and a call tree root, respectively.

Some embodiments perform a tree aggregate post-processing phase. This phase may include the following. Filter out huge trees that cause timeouts and memory issues. Compute post aggregate data. Summarize the total counts of every tree by its hash. Summarize the total trees a service is a part of (found in). Compute top occurring trees in the service. Compute % of total trees in the service. Prepare pre-aggregate data. Distinct hashes to ensure uniqueness. Decode, expand, and unpack data. Join pre-aggregate and post-aggregate data. Join with data for ownership per tree node. The "join" herein refers to a relational database join or logically equivalent operation on set membership.

Some embodiments generate and display a picture representing an aggregated call tree pattern. This may include an annotated call tree along the lines of the one shown in FIG. 16. The display may also show related data to distinguish 1210 between scenarios, such as an alphanumeric call tree ID, a scenario title (e.g., "Mobile Application Management"), optional child scenario data (e.g., "IW Scenarios (Checkin, Enroll, etc.)", a scenario description 708, and a child scenario description 708. For instance, the scenario description may be something along the lines of "As an IT Pro, Mobile Application Management should allow me to apply policy and configurations to supported applications which implement the Intune Management SDK." The child scenario description may be something along the lines of "Scenarios which involve an end user interacting with a MAM SDK enabled application."

Some embodiments include functionality to do Trend or Projection or Anomaly detection of a given pattern over time.

Some embodiments include functionality 210 to display a raw data view with normalized URLs or URIs. The examples and functionalities described herein with URLs may also be applied to other URIs. For instance, in some embodiments data like that shown in FIGS. 13-15 and 17 may be displayed.

Some embodiments include scenario labeling functionality 210 to facilitate mapping between a scenario 410 and a tree pattern 214. For example, a Scenario Mapper user interface may instruct a user to select Scenario dropdown values for Call Tree Hash, Source Service, Scenario Name, and Child Scenario Name. If no Scenario exists, the user may direct the embodiment to create one using scenario editing functionality 210. As an example, the Call Tree Hash may be a number identifying a call tree, the Source Service may be StatefulMAMService or the like, the Scenario Name may be "Mobile Application Management" or the like, and the Child Scenario Name may be "IW Scenarios(Checkin, Enroll, etc.)" or the like.

Some embodiments perform environment and signoff. Some of these allow a user to view what percentage of a service's total traffic a given tree pattern takes up. Some superimpose traffic patterns graphically. Some indicate whether a given pattern 214 was part of performance testing, or part of load gen testing, for example. Some embodiments can be used for defining or determining test coverage and filling any gaps found.

Some embodiments include functionality 210 to compare patterns 214 of different environments or determine scenario coverage for signoffs, based on actual customer usage patterns. For example, some embodiments provide a display which includes an annotated call graph, identifying information such as call tree ID and scenario title, and a tabulation with columns for data such as Production Environment Call Tree ID, Scanned Service, % of Service, Load Gen, Non Load, and scenario metadata.

Technical Character

The technical character of embodiments described herein will be apparent to one of ordinary skill in the art, and will also be apparent in several ways to a wide range of attentive readers. Some embodiments address technical activities such as building call graphs 1000, normalizing 1202 call graphs, aggregating 1214 normalized call graphs, comparing 1106 traffic patterns 214, and assigning 1122 an operational priority 216 based on a schema 316, which are each an activity deeply rooted in computing technology. Some of the technical mechanisms discussed include, e.g., traffic characterization prioritization software 302, an operational priority schema 316, metadata 314, traffic characterizations 206, service entry points 312, query languages 820, clustering algorithms 816, and scenario 410 editors. Some of the technical effects discussed include, e.g., location 1110 of coverage 606 gaps 634, determination 1112 of scenario 410 coverage 606, mitigation from detection of a cyberattack 624 or a deployment anomaly 412, and efficient effective prioritization 208 of different circumstances involving traffic 204 in a computing system 212. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

For example, some embodiments detect a cyberattack 624 based on comparison 1106 of a current 808 traffic pattern to an example 812 pattern from a prior cyberattack 624. If the patterns' overlap is above a specified threshold, e.g., 90%, or if the attack example pattern is a sub-pattern of the current pattern, then an attack is presumed. This provides a detection, or at least a confirmation, of the attack, which aids damage mitigation by triggering defensive mechanisms. For instance, a denial of service attack 624 detection may trigger increased filtering, reallocation of bandwidth, or pressing quiescent bandwidth into service.

Formulation 1104 may also determine the blast radius of an attack, in terms of which parts of the code, and in terms of which customers when certain customers are associated with certain scenarios. It may also be possible to determine whether the code under attack has been tested 612. Spikes may be part of the attack pattern 626 for some attacks.

Some embodiments detect 1106 the lack of an expected traffic pattern. When a pattern 214 present in pre-production does not show up in production, something in the production software may be broken.

Other benefits of particular steps or mechanisms of an embodiment are also noted elsewhere herein in connection with those steps or mechanisms, or would be readily apparent to one of skill in the art, or both.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively process vast amounts of log data to characterize the health, efficiency, security, optimization opportunities, or other characteristics of a computing system. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular displays, scenarios, motivating examples, operating environments, peripherals, software process flows, identifiers, data structures, data selections, naming conventions, formats, notations, control flows, or other implementation choices described herein. For instance, portions of a FIGS. 13-15 table may be omitted, e.g., the HTTP verb. Any apparent conflict with any other patent disclosure, even from the owner of the present innovations, has no role in interpreting the claims presented in this patent disclosure.

Note Regarding Hyperlinks

Portions of this disclosure refer to URIs, URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URIs, URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
GUID: globally unique identifier
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service 310 implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Traffic characterization prioritization operations such as call graph construction 1236, call graph normalization 1202, string comparison 824, normalized call graph clustering 1216 or grouping 128, traffic pattern comparison 1106, and many other operations discussed herein, are understood to be inherently digital. A human mind cannot interface directly with a CPU or other processor, or with RAM or other digital storage, to read and write the necessary data to perform the traffic characterization prioritization steps 1200 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as aggregating, ascertaining, assigning, associating, building, clustering, comparing, constructing, delimiting, designating, determining, discerning, distinguishing, employing, finding, formulating, generating, grouping, identifying, labeling, locating, mapping, normalizing, obtaining, performing, predicting, removing, sampling, spotting, utilizing (and aggregates, aggregated, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

102 computer system, also referred to as a "computational system" or "computing system", and when in a network may be referred to as a "node"

104 users, e.g., user of an enhanced system 202; refers to a human or a human's online identity unless otherwise stated 106 peripheral device 108 network generally, including, e.g., LANs, WANs, software-defined networks, clouds, and other wired or wireless networks 110 processor; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102

120 kernel(s), e.g., operating system(s), BIOS, UEFI, device drivers 122 tools, e.g., version control systems, cybersecurity tools, software development tools, office productivity tools, social media tools, diagnostics, browsers, games, email and other communication tools, commands, and so on 124 user interface; hardware and software 126 display screens, also referred to as "displays"

128 computing hardware not otherwise associated with a reference number 106, 108, 110, 112, 114

130 log, e.g., one or more of a syslog, security log, event log, event database, instrumentation output, audit trail, packet capture, execution trace, profiling or debugging instrumentation output, or other digital record of communication from any hardware or software component of a system 102; may be in JSON, HTML, or other text formats 132 cloud, cloud computing environment 202 system 102 enhanced with traffic characterization prioritization functionality 210

204 traffic, e.g., digital record of electronic communication 204 from or between one or more items in a computing system 102; e.g., as memorialized in a log; may include, e.g., calls, transactions, exception handler invocations, interrupt handler invocations, or other control flow transfer sequences 206 traffic characterization, e.g., any of computational steps 1104 through 1120 when based on at least one traffic pattern 214

208 traffic prioritization, e.g., assigning an absolute or relative importance to one or more traffic characterizations 206

210 traffic characterization prioritization functionality; e.g., software or specialized hardware which performs or is configured to perform traffic characterization 206 or traffic prioritization in the form of traffic characterization prioritization 208, e.g., software 302, software which performs steps 1104 and 1104, or step 1104, or steps 1104 and 1122, or any software or hardware which performs or is configured to perform a method 1200 or a computational activity first disclosed herein 212 monitored computing system, e.g., a system 102 from which or representing which traffic 204 is obtained 214 traffic pattern, e.g., a digital data structure containing or constructed from aggregated normalized call graphs, or a digital data structure including an aggregation 304 of a plurality of normalized call graphs 306 which share an entry node 308; a data structure which includes a bucket of one or more normalized call graphs; the traffic pattern may include metadata such as provenance of the normalized call graphs or a human-created label or description 216 operational priority, e.g., a digital value representing an absolute or relative importance of a situation or circumstance (e.g., characterization 206) in or for the operation of a computing system 102; a priority representing a relative urgency, relative importance, relative cost, impact, or another metric for allowing or prohibiting or altering operation of a computing system; may be enumerative (e.g., low, medium, high) or numeric (e.g., level 2 in a range from 1 to 10, with 1 being most important)

302 traffic characterization prioritization, e.g., software which upon execution provides functionality 210

304 an aggregation of normalized call graphs; digital; two or more normalized call graphs placed together in a bucket (a.k.a., a group or a cluster) based on their similarity to one another; aggregation may be performed, e.g., using an unsupervised machine learning clustering algorithm, or string comparison (some query language operators such as group-by may utilize string comparison)

306 normalized call graph 1000; digital; a call graph which has been normalized by removal or unification of at least one piece of data that had distinguished the call graph from another call graph 308 entry node of a call graph, also referred to as root node; digital 310 service in a computing system; see definition of "service"

312 entry point to a service 310; digital
314 metadata generally; data 118 which indicates a purpose, intended use, limitation, nature, or other informative aspect of an item in a computing system; metadata is often human-legible or presented as such via a user interface 124
316 operational priority schema, e.g., a multi-column table, list of pairs, or other data structure which associates characterizations 206 with priorities 216
318 interface in a computing system; computational
402 pattern comparison, e.g., a result of computational step 1106; may be numeric, e.g., a percentage of patterns' overlap or a number of shared nodes 1002, or may be a portion of a pattern, e.g., a set of nodes 1002 and calls 1004 present in each of two patterns 214
404 redundancy in a pattern 214, e.g., a node or a sub-graph of the pattern which is traversed twice as a flow of traffic through the pattern is followed; the redundancy may be benign, e.g., as when a library function is called as expected from different locations, or the redundancy may be an opportunity for optimization as when a value is calculated then not used and then recalculated and finally used
406 coverage insufficiency, e.g., an undesired coverage gap 634 between two patterns 214 or an undesired evident difference within a single pattern 214 between a portion of the pattern that has a particular characteristic (e.g., was exercised during testing, was not flagged as problematic during normalization) and a portion that lacks the particular characteristic; represented digitally; an acceptable gap 634 is not treated as an insufficiency 406
408 flag, mapping, metadata, or other digital indication that a traffic pattern is specific to a particular scenario 410, e.g., metadata indicating that the pattern is based on a device enrollment scenario
410 scenario; a digital representation of particular circumstances in which traffic occurred, or might occur, or should not occur; a set of one or more traffic patterns; may include metadata such as provenance of the traffic pattern(s) or a human-created label or description
412 anomaly, as detected computationally and represented digitally, e.g., unusual data, data that differs from normal or expected data
414 impact region, e.g., downstream portion from a node in a call graph or a traffic pattern, e.g., a sub-graph; an impact region of a node X includes calls or routines whose behavior is dependent on the system's behavior at node X
416 performance of a system, as measured, e.g., in processor usage, memory 112 usage, transactions processed, bandwidth used, or other computational measures
418 optimization, e.g., a result of performance optimization, security optimization, availability optimization, usability optimization, etc.; see definition of "optimize"; may also refer to software that is identified as a candidate for optimization
420 call, e.g., computational invocation of an entry point or other routine 504
422 timing in a computing system; may refer, e.g., to how long a call takes to reach a routine, how long a called routine runs, or to the relative time of occurrence of multiple calls; may be done at a node level or a sub-graph level, for example
424 analysis, e.g., static flow analysis, dynamic flow analysis, performance analysis, throughput analysis
426 flow, e.g., flow of control or flow of data, in a computing system
428 time interval, e.g., absolute or relative
502 application program interface; digital; not limited to applications per se—may also be an interface to other software
504 routine 506 in an API 502
506 routine; see definition of "routine"; may occur within a machine or be made from one machine to another
508 event, call back, interrupt, exception, or other trigger that operates asynchronously
510 background task, e.g., event handler, exception handler, interrupt handler, suspended task, or other routine 506 not presently in an executing thread
512 routine 506 in user interface 124 software
514 check-in, e.g., polling, heartbeat, or periodic event
516 routine 506 performing a check-in 514 operation
602 signoff, e.g., approval or permission to proceed in a development cycle, as represented digitally in a system 102
604 signoff coverage, e.g., a digital representation of which portion or how much of a software or software project has been approved; may also indicate how much or which portion has been submitted for approval (approval decision may not yet have been made, or approval may have been denied, depending on particular circumstances of a system 102); an example of coverage 606
606 coverage generally, e.g., which portion or how much of a software or software project has been submitted to a particular development activity or has been through a particular development activity; some examples of a particular development activity include build, testing, signoff, deployment, public release; as represented digitally in a system 102
608 gap in signoff coverage as represented digitally in a system 102 between a measured coverage 604 and a target coverage 604
610 signoff coverage gap operational priority, e.g., an operational priority 216 which is assigned to, associated with, or otherwise designates 1204 a signoff coverage gap 608
612 testing, e.g., testing of output accuracy, performance speed, performance efficiency, security, usability, availability, or another characteristic of software execution, as represented digitally in a system 102
614 testing coverage, e.g., a digital representation of which portion or how much of a software or software project has been tested (manually or automatically or both); may also indicate how much or which portion has been submitted for testing (testing may not yet have been completed, depending on particular circumstances of a system 102); an example of coverage 606
616 gap in testing coverage as represented digitally in a system 102 between a measured coverage 614 and a target coverage 614
618 testing coverage gap operational priority, e.g., an operational priority 216 which is assigned to, associated with, or otherwise designates a testing coverage gap 616
620 characteristic of being unexplained, e.g., having a cause or basis which is unclear or unidentified from a developer's perspective
622 unexplained redundancy operational priority, e.g., an operational priority 216 which is assigned to, associated with, or otherwise designates an unexplained redundancy 404

624 cyberattack, e.g., unauthorized attempt to access or otherwise utilize a computational resource, e.g., a resource 102, 110, 112, 114, 116, 118, 120, 122, 126, 128, 130, or 132

626 cyberattack pattern, e.g., a pattern 214 indicative of a cyberattack 628 cyberattack pattern operational priority, e.g., an operational priority 216 which is assigned to, associated with, or otherwise designates a cyberattack pattern 626

630 deployment, e.g., distributing copies of software, creating or spinning up virtual machines, setting enablement flags to permit execution, or otherwise facilitating execution of software which is thereby said to be undergoing deployment 632 deployment anomaly operational priority, e.g., an operational priority 216 which is assigned to, associated with, or otherwise designates a deployment anomaly 412

702 non-production environment, e.g., internal-only environment 100 for software development 704 production environment, e.g., external environment 100 providing developed software for commercial use 706 environment 100 metadata 314, e.g., metadata identifying a category 702 vs 704 of an environment, or metadata identifying or describing aspects of a particular environment 708 scenario 100 metadata 314, e.g., metadata identifying a scenario or describing aspects of a particular scenario 802 traffic pattern similarity, e.g., as measured by a metric 806

804 traffic pattern similarity threshold; digital value 806 traffic pattern similarity metric, e.g., digital value representing similarity of two or more traffic patterns based on one or more of: graph isomorphism, edit distance, feature extraction, neighborhood similarity, subgraph matching, betweenness, graph matrix eigen decomposition, machine learning, or an adaptation of vector similarity, for example 808 current traffic or traffic pattern representing current traffic; "current" may be defined in a given embodiment as, e.g., within most recent hour, or most recent full hour, most recent day, or most recent full day, etc.

810 requisite traffic or traffic pattern representing requisite traffic; e.g., certain traffic may need to be present (or absent) for a deployment 630 to be considered successful, or an attack 624 defense to be considered successful; aspirational patterns 214 may also be considered requisite patterns 214, 810 in a given embodiment 812 example traffic or traffic pattern representing example traffic; e.g., an example pattern 812, 214 for weekday daytime website traffic, or an example pattern 812, 214 for device enrollment 908 using version N of the software 814 constriction in a traffic flow, e.g., choke point or bottleneck or throttle that results in traffic backing up or being otherwise delayed in contrast to traffic flow prior to the constriction 816 unsupervised learning algorithm for clustering, e.g., affinity propagation, agglomerative clustering, or K-means clustering 818 cluster created using an algorithm 816; digital 820 query language, e.g., SQL (Structured Query Language) or another data manipulation language in a system 102; may also refer to GROUP-BY or a similar grouping operator in a query language 822 group created using a query language; digital 824 string comparison algorithm or routine; may also refer to a result of performing string comparison 826 load exercising or otherwise utilizing one or more computational resources 828 computational creation of an anomaly or traffic related to an anomaly 412

830 computational creation of a burst in traffic, e.g., sharp spike or sudden change in traffic volume 902 mobile application, e.g., software designed to run on a mobile device such as a smartphone, tablet, laptop, or wearable computing device 904 management of a computing device or set of computing devices, e.g., installing, monitoring, prohibiting certain applications 906 group of devices 102, e.g., as specified by an admin; a selection of devices may be placed in a named group as a target 908 enrollment of a device 102; may refer to computational activity or to a resulting configuration change in a system 102; refers, e.g., to a device enrolling with a service 910 policy governing, e.g., security, availability, or another aspect of a computing system component or activity, as represented digitally 912 delivery of a policy 910; may include enablement or enforcement of the policy; computational; may occur as part of an activity sequence in which a user directs selection or creation of a policy which then flows through a system to be delivered to a device 914 status check-in of a device 102; may refer to computational activity or to a resulting configuration change in a system 102; refers, e.g., to a device connecting to a service to submit a request or update the service as to device status 916 device configuration, e.g., default settings, environment variables, permissions and other security settings and artifacts, applications, and other system 102 digital values which are subject to administrative management 918 compliance with a target configuration 916, e.g., calculating a device's configuration status during check-in 1000 call tree generally; may also be referred to as a call graph; digital representation of traffic 204 and its sources and destinations in a system 102; e.g., a digital data structure such as a tree or other graph representing traffic 204 instances which save state, transfer control, execute at least one instruction, transfer control back, and restore state, during execution of software in a computing system; a call graph may be constructed, e.g., using correlation vectors or instrumentation code 1002 traffic node, e.g., a routine which makes a call or is called; part of a call graph 1000

1004 traffic communication, e.g., a call in a call graph 1000; may include parameter values, may include timestamp value(s); has a source 1002 and a target destination 1002 (does not necessarily reach the target)

1100 flowchart; 1100 also refers to traffic characterization prioritization methods illustrated by or consistent with the FIG. 11 flowchart 1102 computationally obtain a traffic pattern, e.g., by receiving a previously computed pattern via an API, or by computing the pattern from underlying call graphs 1000

1104 computationally formulate a traffic characterization 206

1106 computationally compare two traffic patterns, e.g., by measuring a distance between respective aggregations in the two patterns using string comparison or a vector similarity metric or a graph comparison metric

1108 computationally find a redundancy in a traffic pattern, e.g., by finding loops in a call graph of the traffic pattern

1110 computationally locate a coverage gap, e.g., by comparing 1106 traffic patterns from two respective environments or two respective scenarios, with respect to coverage 606

1112 computationally determine scenario coverage, e.g., by checking a scenario-specific traffic pattern for coverage 606 metadata 314

1114 computationally delimit an impact region of a node or node set in a traffic pattern, e.g., by identifying traffic which is downstream from the node or node, e.g., via data flow or control flow analysis

1116 computationally spot an optimization candidate, e.g., a redundancy 404 which produces unused output, or a constriction 814

1118 computationally perform a timing analysis, e.g., a static timing analysis of normalized call graphs; may be performed, e.g., at a node-to-node level, a pattern level, a scenario level, or a pattern versus pattern level

1120 computationally predict a traffic flow, e.g., by matching a current traffic pattern to a portion of a larger example traffic pattern and using an unmatched portion of the larger example traffic pattern as a prediction, or extrapolation based on one or more traffic patterns 214

1122 computationally assign a priority 216 to a characterization 206, e.g., by associating them with each other in a data structure

1124 computationally employ a priority 216 to modify system operation, e.g., by automatically preventing release of a software version whose coverage 606 has not satisfied a minimum threshold, by automatically halting (or rolling back, or both) a deployment whose traffic pattern does not meet a requisite pattern, or by automatically initiating cyberattack countermeasures, based on the priority

1126 computationally modify system operation, e.g., by performing an activity that would not have otherwise been performed, or but not performing an activity that would have otherwise been performed

1128 system 102 operation, e.g., as represented in traffic 204 in the system

1200 flowchart; 1200 also refers to traffic characterization prioritization methods illustrated by or consistent with the FIG. 12 flowchart (which incorporates the steps of FIG. 11)

1202 computationally normalize a call graph

1204 computationally designate a characterization for prioritizing

1206 computationally prioritize two or more characterizations relative to each other (equal priority, higher priority, lower priority); an example of prioritization 208

1208 computationally distinguish between environments, e.g., using metadata 706

1210 computationally distinguish between scenarios, e.g., using metadata 708; a scenario variation analysis may computationally check for patterns that differ more than a specified threshold and report which variations are present within a given scenario

1212 computationally associate a traffic pattern with metadata 314, e.g., in a data structure

1214 computationally aggregate normalized call graphs, e.g., by clustering 1216, grouping 1218, or both

1216 computationally cluster normalized call graphs, e.g., using a clustering algorithm 816

1218 computationally group normalized call graphs, e.g., using string comparison 824 or a data manipulation operation 820 or both

1220 computationally discern a traffic flow constriction, e.g., by timing analysis or data flow analysis of a normalized call graph

1222 computationally identify a test coverage gap 616, e.g., by comparing current testing coverage to requisite testing coverage

1224 computationally ascertain a signoff coverage gap 608, e.g., by comparing current signoff coverage to requisite signoff coverage

1226 computationally generate traffic based on a pattern 214, e.g., by repeating a call to the entry point 312

1228 computationally map a traffic pattern to a scenario, e.g., using metadata

1230 computationally utilize generated 1226 traffic, e.g., for testing 612

1232 computationally build node connections 1234 in a call graph, e.g., by instrumentation that tracks a correlation vector

1234 parent-child or other node relationship in a call graph, e.g., as represented by a call 1004

1236 computationally construct a call graph, e.g., as a data structure based on a log 130

1238 computationally remove uniqueness, e.g., by replacing certain strings (per a removal string list or per string syntactic location, or both) with "##" or other grouping characters, e.g., during normalization

1240 uniqueness, e.g., a string identifying a particular address, particular device, or particular parameter value in a call graph

1242 computationally sample traffic data

1244 computationally label a pattern with metadata, e.g., via a data structure

1246 any step discussed in the present disclosure that has not been assigned some other reference numeral

CONCLUSION

In short, the teachings herein provide a variety of computing system traffic characterization prioritization functionalities 210 which operate in enhanced systems 202. Some embodiments process log data 130 into traffic patterns 214, using call graph 1000 normalization 1202 and aggregation 1214. Traffic patterns 214 are characterized 1104, by comparing 1106 traffic patterns 214, finding 1108 redundancies 404, locating 1110 coverage 606 gaps 634, delimiting 1114 impact regions 414, spotting 1116 optimization 418 candidates, performing 1118 timing analyses 424, predicting 1120 traffic flow 426, or other operations. Resulting traffic characterizations 206 are prioritized 1122, and priorities 216 help guide operational changes 1126 in a computing system 102. Gaps 634 between the traffic patterns 214 of different environments 100 or different scenarios 410 may be located 1110, leading to changes 1126 in signoff coverage 604 or testing coverage 614 or both. Deployment 630 traffic anomalies 412 may trigger 1124 rollback 1128. Traffic patterns 214 indicative of cyberattacks 624 may trigger 1124 security countermeasures 1128.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIG. 11 or 12 also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to assign operational priorities to traffic characterizations of a monitored computing system, the computing system comprising:
    a digital memory;
    a processor in operable communication with the digital memory, the processor configured to execute traffic characterizations prioritization including: (a) computing or otherwise obtaining at least one traffic pattern representing data traffic of the monitored computing system, the traffic pattern including an aggregation of a plurality of normalized call graphs which share an entry node, the entry node representing a service entry point to the monitored computing system, (b) formulating a traffic characterization by at least one of: comparing two obtained traffic patterns to each other, finding a redundancy in an obtained traffic pattern, or locating a difference within an obtained traffic pattern between a first portion of the obtained traffic pattern that has a particular characteristic and a second portion of the obtained traffic pattern that lacks the particular characteristic, and (c) assigning an operational priority to the formulated characterization based on an operational priority schema.

2. The computing system of claim 1, comprising at least one obtained traffic pattern which includes the entry node representing the service entry point, and wherein the service entry point includes at least one of the following: a user interface routine, a device check-in routine, a triggered background task, or an application program interface routine.

3. The computing system of claim 1, comprising the operational priority schema, and wherein the operational priority schema includes at least two of the following:
    a signoff coverage gap operational priority designated for prioritizing a signoff coverage gap;
    a testing gap operational priority designated for prioritizing a testing gap;
    an unexplained redundancy operational priority designated for prioritizing an unexplained redundancy;
    a cyberattack pattern operational priority designated for prioritizing a cyberattack pattern; or
    a deployment anomaly operational priority designated for prioritizing a deployment anomaly.

4. The computing system of claim 1, comprising at least one obtained traffic pattern which includes environment metadata distinguishing between a production environment and a non-production environment.

5. The computing system of claim 1, comprising at least one obtained traffic pattern which is associated with scenario metadata in a natural language.

6. A traffic characterization prioritization method, the method executed by a computing system, the method comprising:
    obtaining at least one traffic pattern representing data traffic, the traffic pattern including an aggregation of a plurality of normalized call graphs which share an entry node, the entry node representing a service entry point;
    formulating a non-empty set of traffic characterizations by at least two of: comparing two obtained traffic patterns to each other, finding a redundancy in an obtained traffic pattern, locating a difference within an obtained traffic pattern between a first portion of the obtained traffic pattern that has a particular characteristic and a second portion of the obtained traffic pattern that lacks the particular characteristic, determining a scenario-specific coverage of an obtained traffic pattern, delimiting an impact region of an anomaly based on an obtained traffic pattern, spotting a performance optimization candidate, performing a call timing analysis, or predicting a traffic flow based on time interval portions of at least one obtained traffic pattern; and
    assigning an operational priority to at least one of the formulated traffic characterizations based on an operational priority schema.

7. The method of claim 6, wherein formulating the set of traffic characterizations includes comparing two obtained traffic patterns to each other, and wherein the comparing comprises at least one of:
    comparing a production environment traffic pattern to a non-production environment traffic pattern;
    comparing a current deployment traffic pattern to a requisite deployment traffic pattern;
    comparing a current flow traffic pattern to a typical flow traffic pattern;
    comparing a monitored traffic pattern to a cyberattack traffic pattern; or
    comparing traffic patterns for similarity using a similarity threshold.

8. The method of claim 6, wherein formulating the set of traffic characterizations includes finding a redundancy in at least one obtained traffic pattern.

9. The method of claim 6, wherein obtaining at least one traffic pattern includes normalizing each of at least two call graphs.

10. The method of claim 6, wherein obtaining at least one traffic pattern includes aggregating the plurality of normalized call graphs, and wherein the aggregating comprises at least one of:
    clustering normalized call graphs using an unsupervised learning algorithm;
    grouping normalized call graphs using a query language operation; or
    grouping normalized call graphs using a string comparison algorithm.

11. The method of claim 6, wherein formulating the set of traffic characterizations includes discerning a traffic flow constriction.

12. The method of claim 6, wherein formulating the set of traffic characterizations includes determining the scenario-specific coverage of at least one obtained traffic pattern.

13. The method of claim 6, wherein formulating the set of traffic characterizations includes at least one of:

identifying a test coverage gap at least in part by comparing a first environment's traffic pattern to a second environment's traffic pattern; or ascertaining a signoff coverage gap.

14. The method of claim 6, wherein formulating the set of traffic characterizations includes delimiting an impact region of an anomaly in at least one obtained traffic pattern.

15. The method of claim 6, further comprising generating traffic based on a traffic pattern, and utilizing the generated traffic for at least one of: performance testing, load testing, anomaly creation, or burst testing.

16. A computer-readable storage device configured with data and instructions which upon execution by a processor cause a computing system to perform a traffic characterization prioritization method, the method comprising:

obtaining at least one traffic pattern representing data traffic, the traffic pattern including an aggregation of a plurality of normalized call graphs which share an entry node, the entry node representing a service entry point;

mapping the traffic pattern to a scenario;

formulating a traffic characterization based on at least the obtained traffic pattern; and assigning an operational priority to the formulated traffic characterization in the scenario based on an operational priority schema.

17. The computer-readable storage device of claim 16, wherein the scenario includes at least one of:

a mobile application management scenario;
a device enrollment scenario;
a device check-in scenario;
a policy delivery scenario;
a device configuration compliance scenario; or
a targeted device group scenario.

18. The computer-readable storage device of claim 16, wherein formulating the traffic characterization includes performing a call timing analysis.

19. The computer-readable storage device of claim 16, wherein formulating the traffic characterization includes at least one of:

comparing a production environment traffic pattern to a non-production environment traffic pattern; or comparing a current flow traffic pattern to a typical flow traffic pattern.

20. The computer-readable storage device of claim 16, wherein formulating the traffic characterization includes comparing a current deployment traffic pattern to a requisite deployment traffic pattern.

\* \* \* \* \*